United States Patent [19]

Suzuki et al.

[11] 4,401,321
[45] Aug. 30, 1983

[54] PASSIVE SEATBELT SYSTEM

[75] Inventors: Ichiro Suzuki, Nagoya; Hisashi Ogawa; Masanao Motonami, both of Toyota, all of Japan

[73] Assignee: Toyota Jidosha Kogyo Kabushiki Kaisha, Toyota, Japan

[21] Appl. No.: 252,141

[22] Filed: Apr. 8, 1981

Related U.S. Application Data

[63] Continuation of Ser. No. 17,929, Mar. 6, 1979, abandoned.

[30] Foreign Application Priority Data

Aug. 16, 1978 [JP] Japan .......................... 53-112185

[51] Int. Cl.³ .......................................... B60R 21/10
[52] U.S. Cl. ................................... 280/804; 16/95 R; 74/30; 296/214; 297/482
[58] Field of Search ............... 280/801, 802, 804, 808; 297/482, 483, 469; 16/91, 95 R; 246/137 A; 74/30; 296/214

[56] References Cited

U.S. PATENT DOCUMENTS

| | | | |
|---|---|---|---|
| 1,090,541 | 3/1914 | Jacobs | 16/95 R |
| 2,674,488 | 4/1954 | Lyijynen | 296/214 |
| 3,074,356 | 1/1963 | Parker | 16/95 R |
| 4,061,365 | 12/1977 | Nagano | 280/804 |

Primary Examiner—Richard A. Bertsch
Attorney, Agent, or Firm—Parkhurst & Oliff

[57] ABSTRACT

A passive seatbelt system of the type including a guide rail, a truck guided on the guide rail, a seatbelt coupled to the truck and a driving means for causing the truck to move. In the seatbelt system, the guide rail is provided on a vehicle-interior side of a roof side member of a vehicle body in between the roof side member and a headliner of the vehicle such that a slit exists between the roof side member and the headliner through which a portion of the truck projects.

5 Claims, 22 Drawing Figures

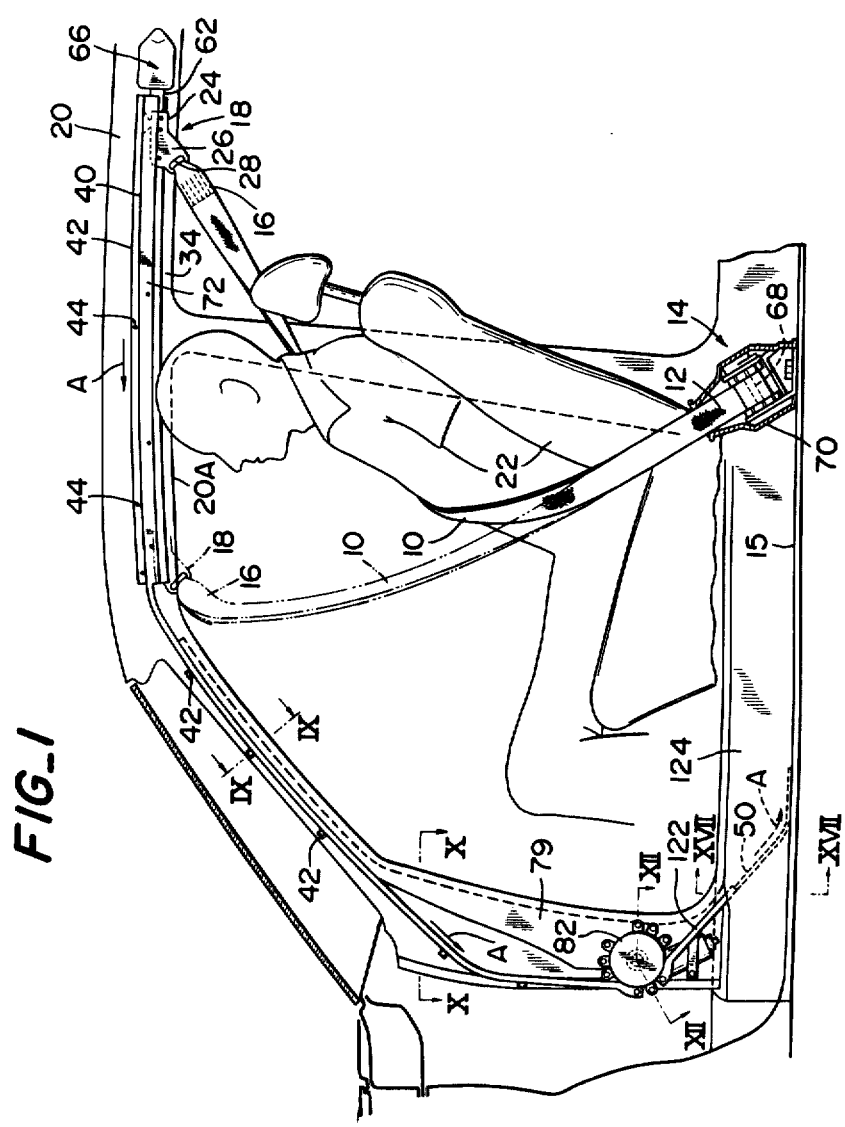
FIG._1

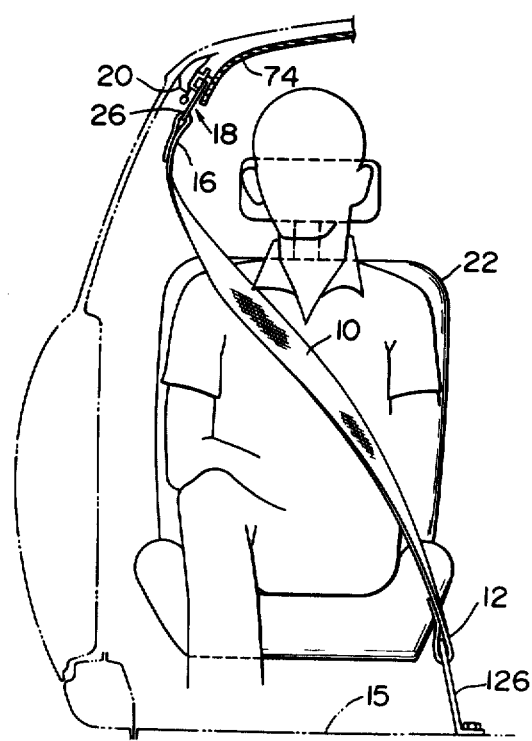
FIG_2

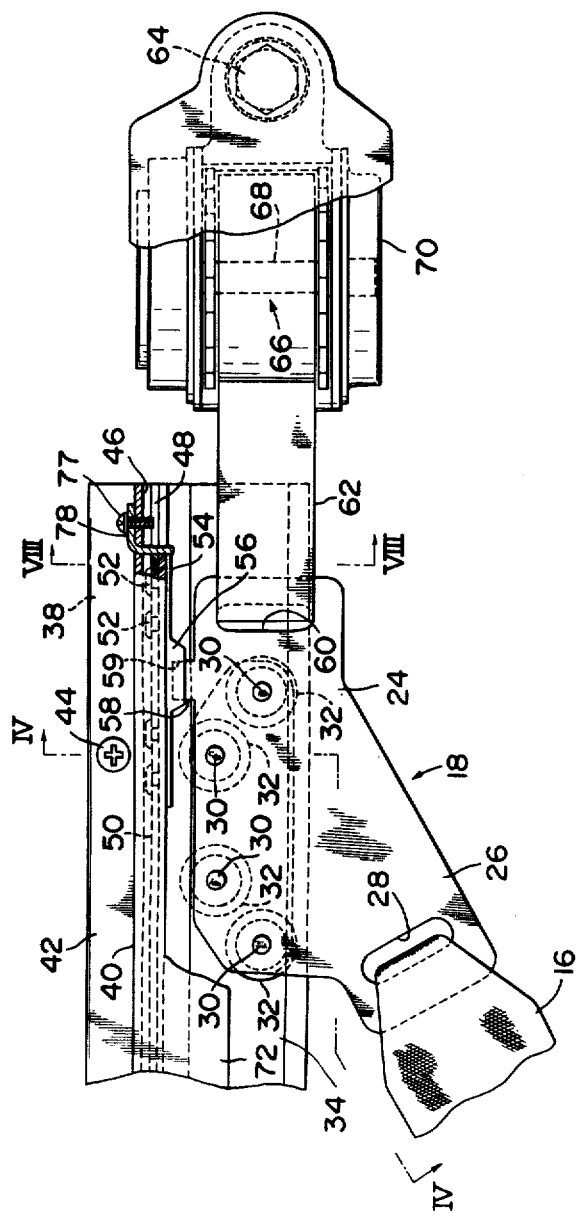

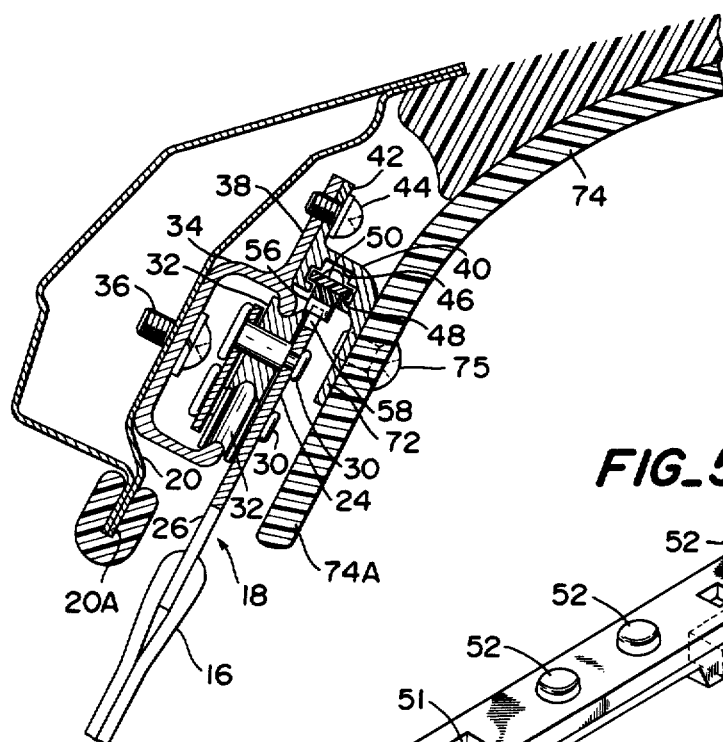
FIG_4
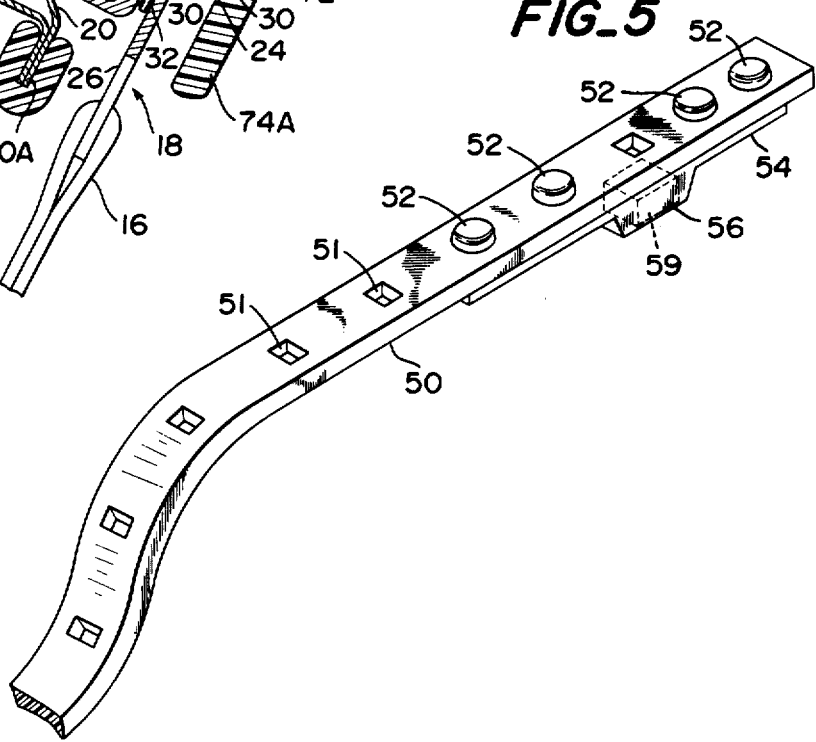
FIG_5

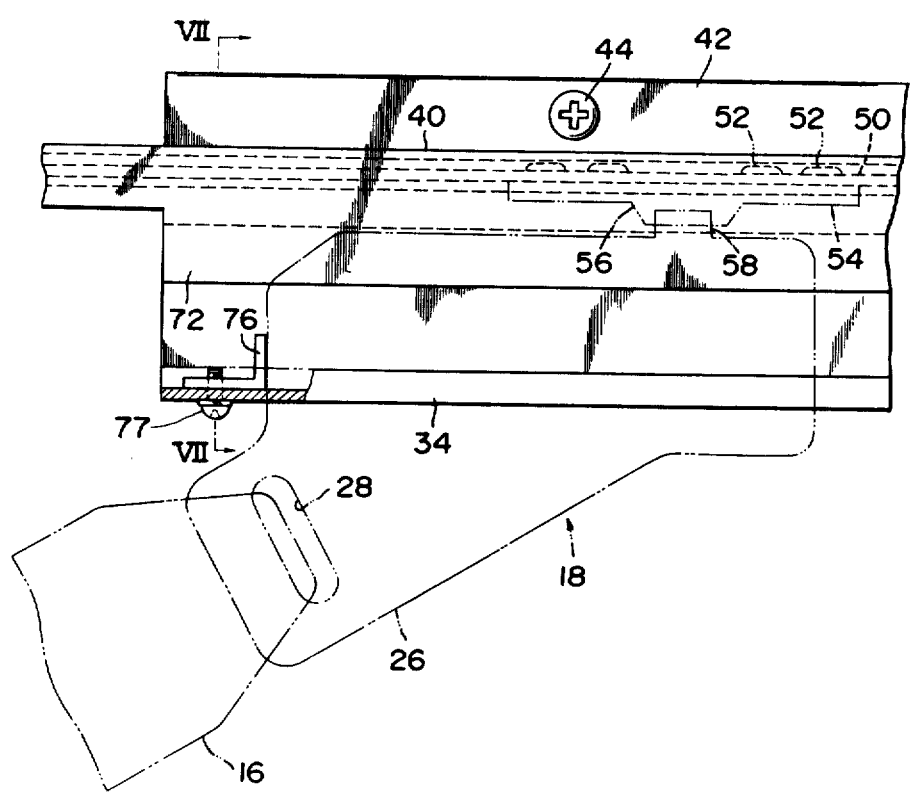

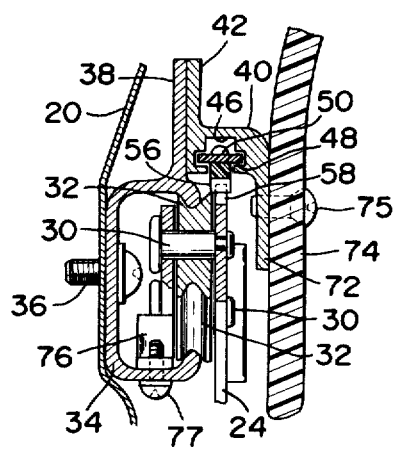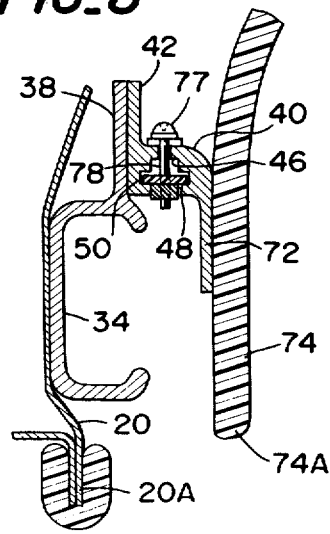

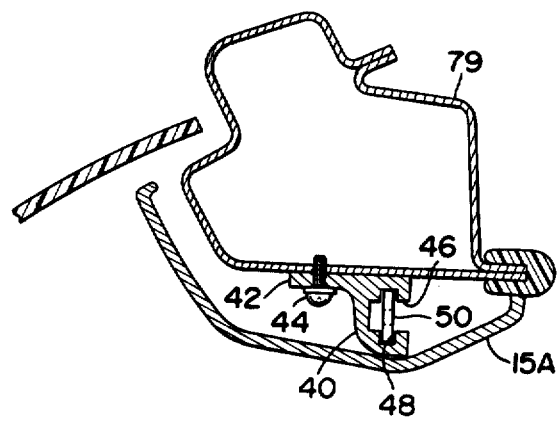
FIG_9
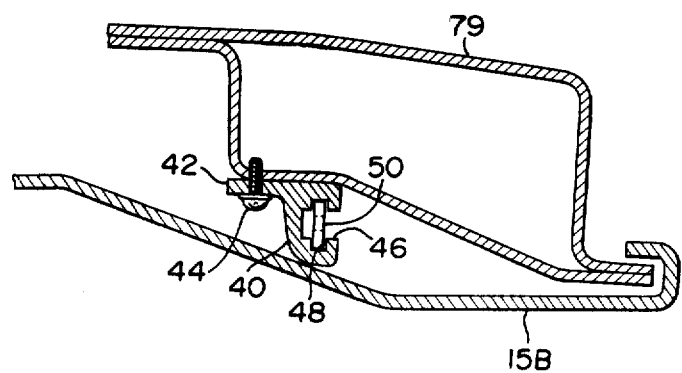
FIG_10

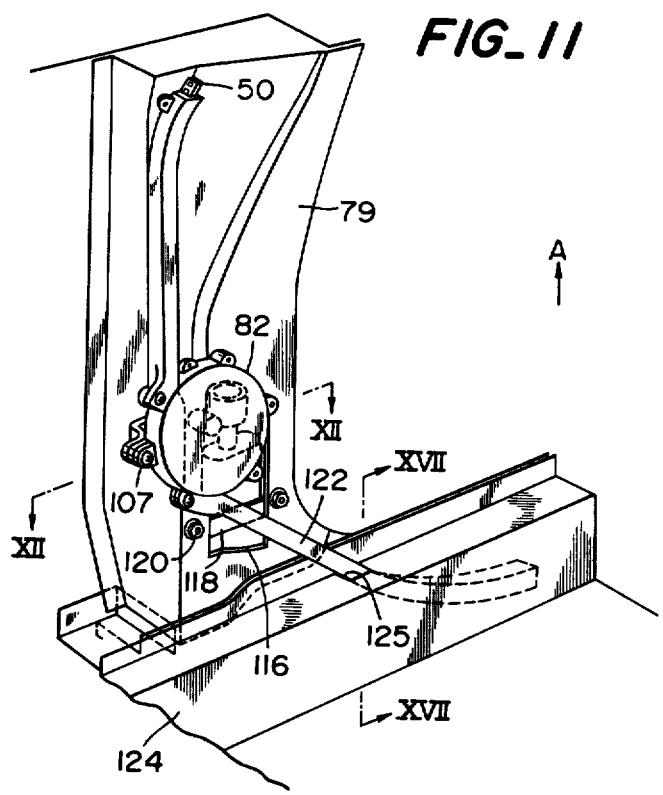
FIG_11
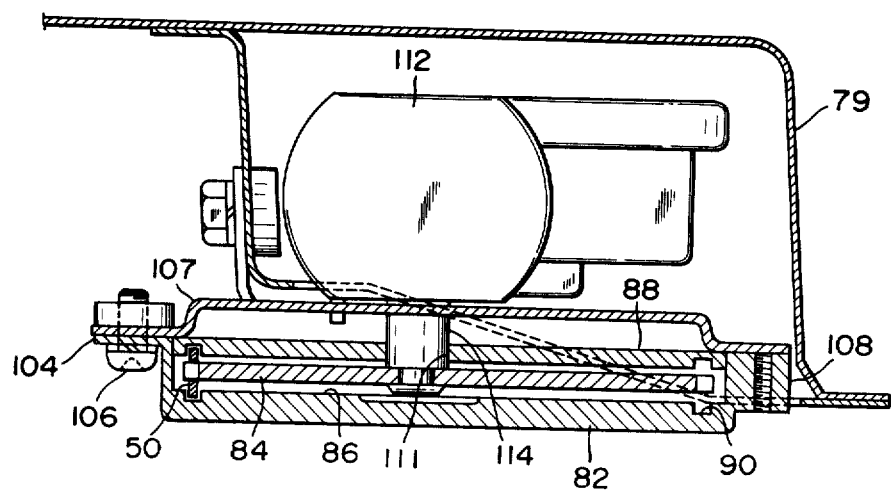
FIG_12

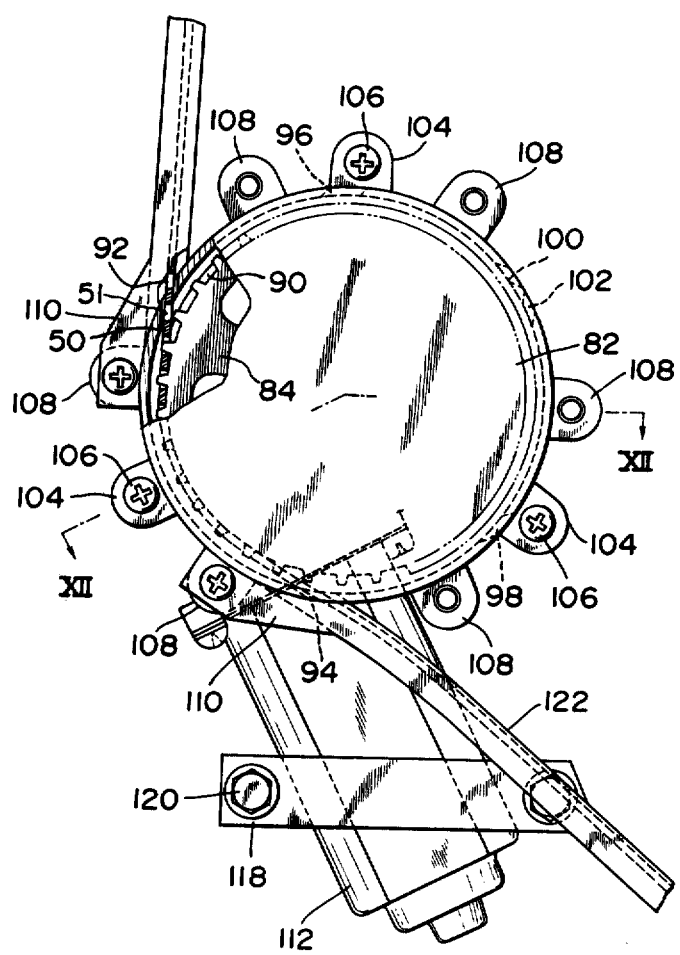
FIG_13

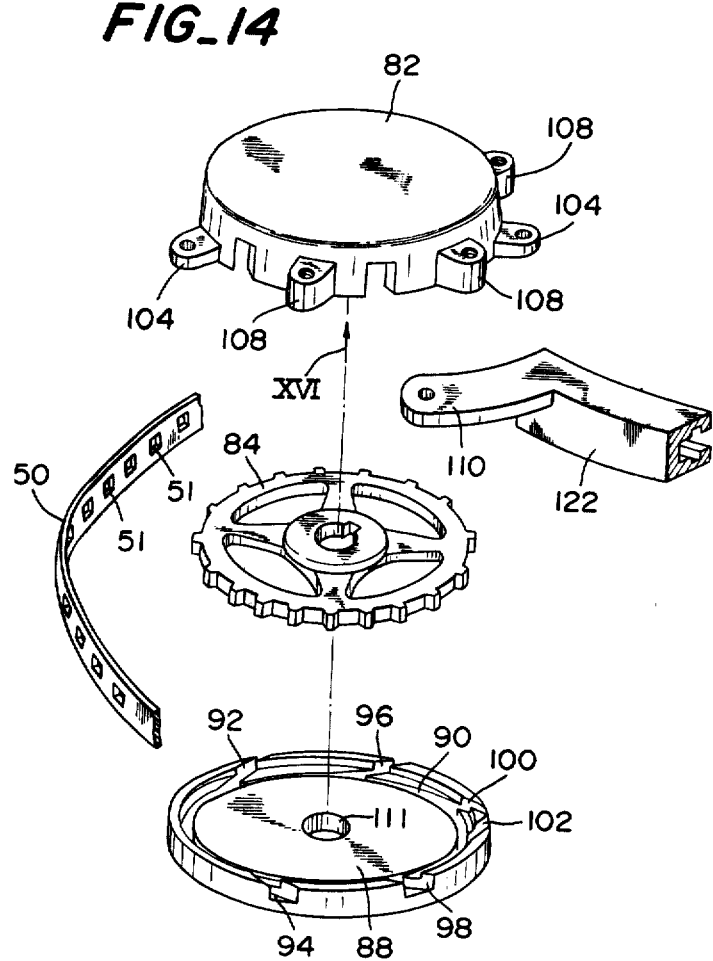

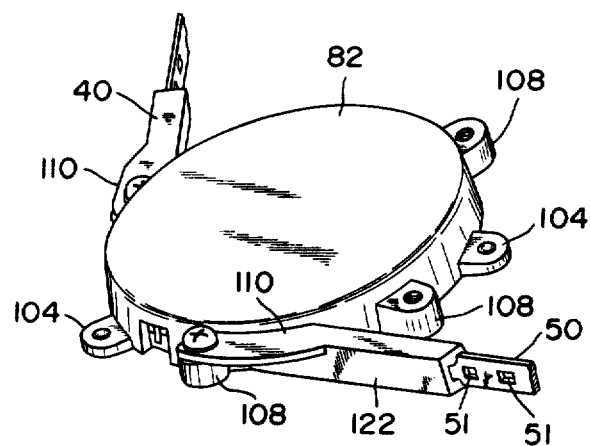
FIG_15
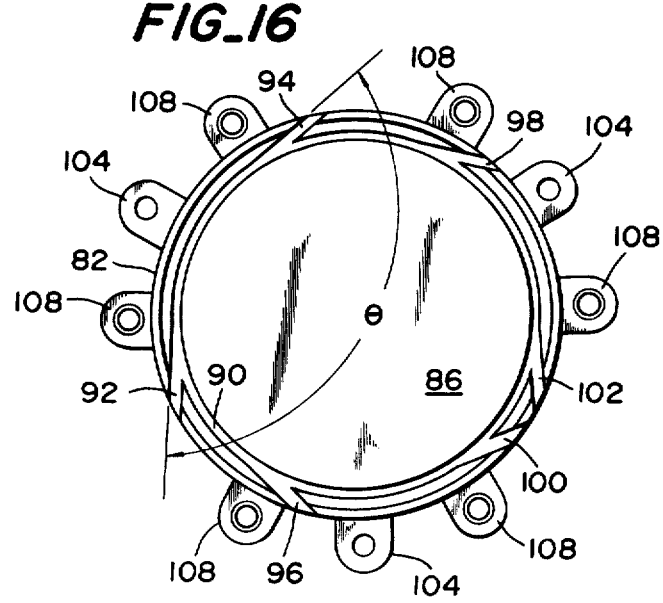
FIG_16

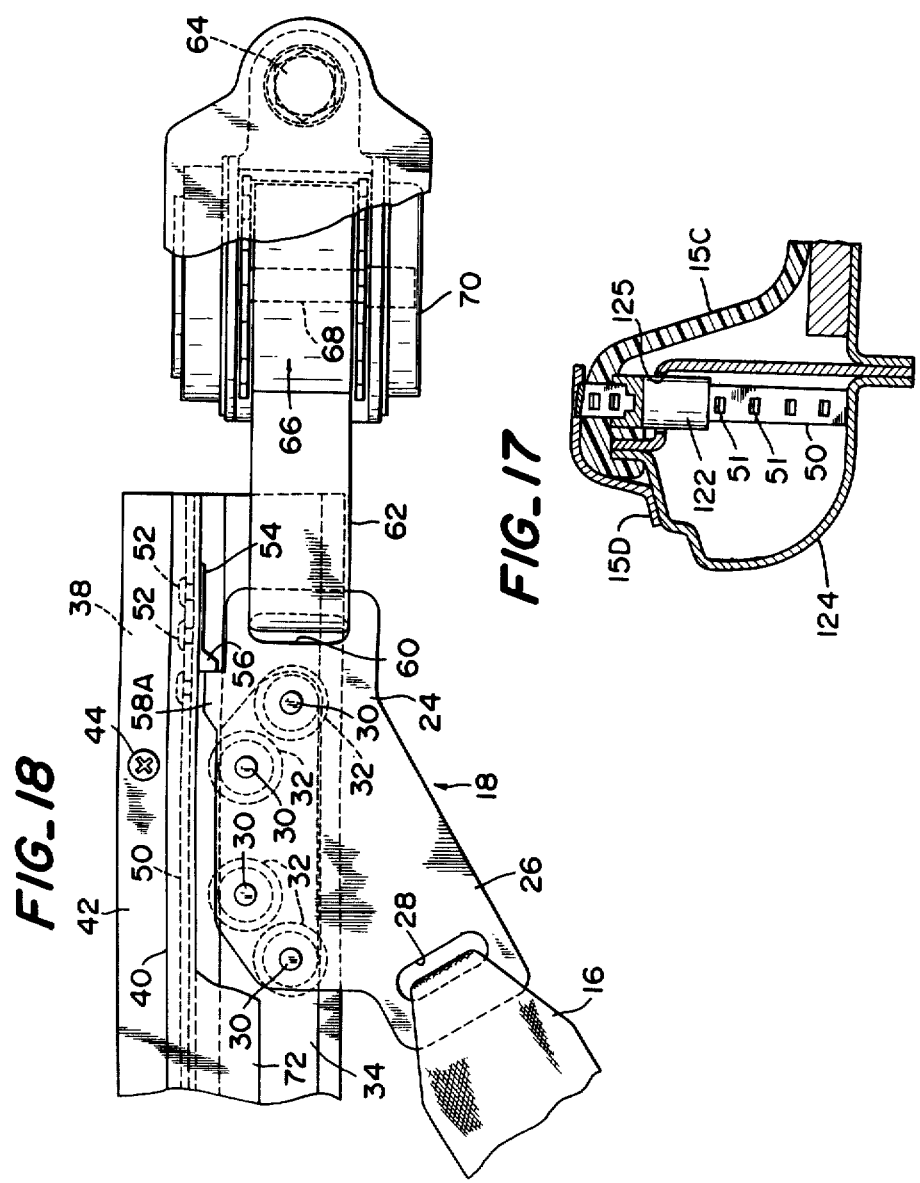

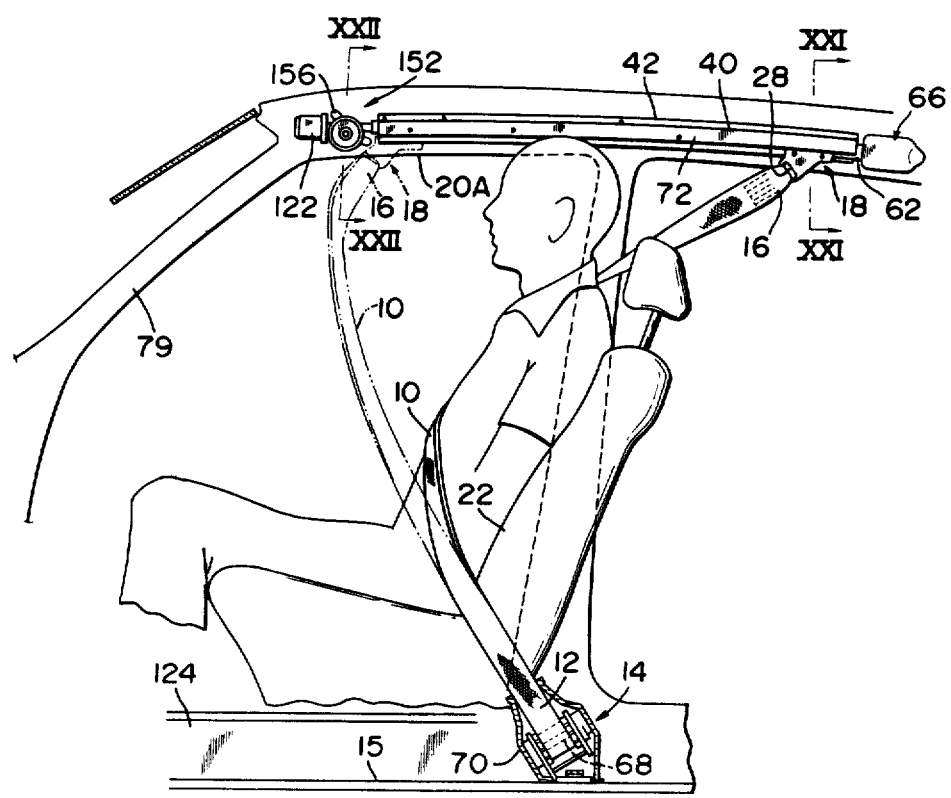
FIG_19

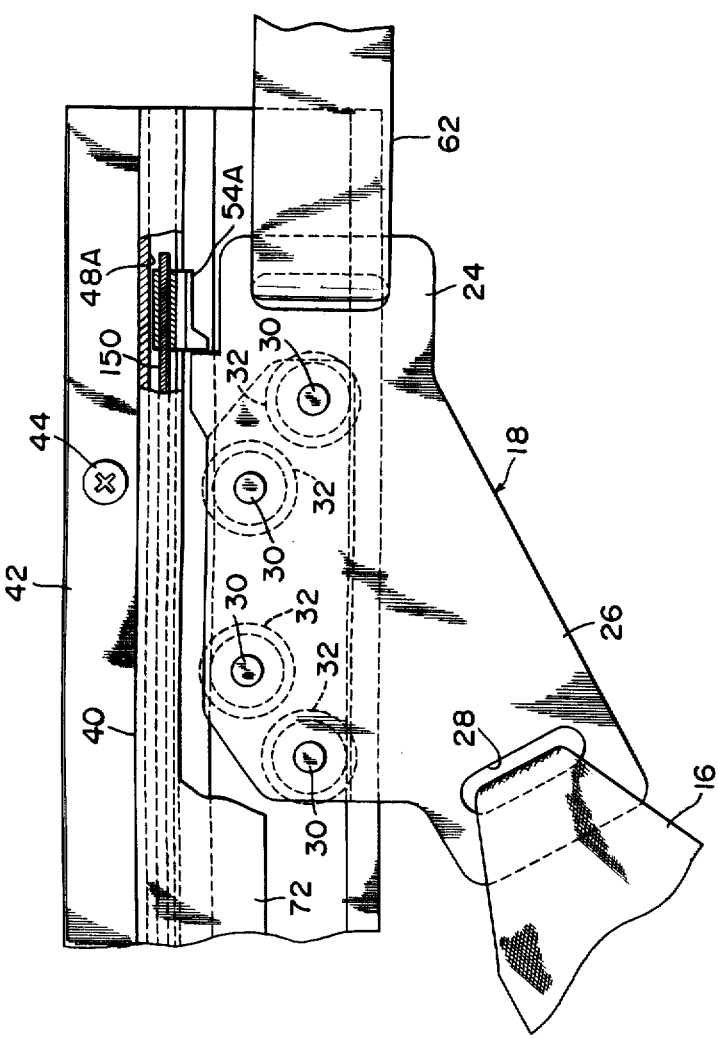

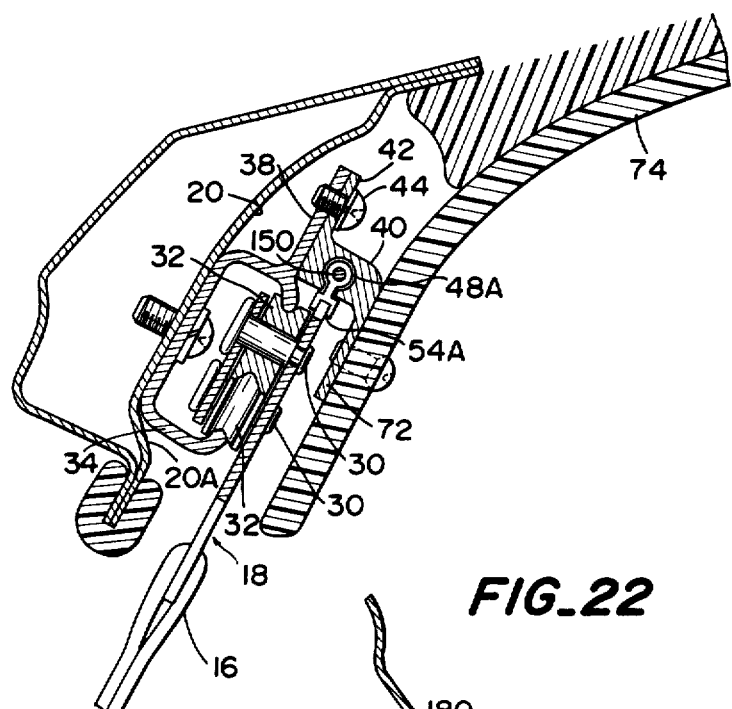
FIG_21
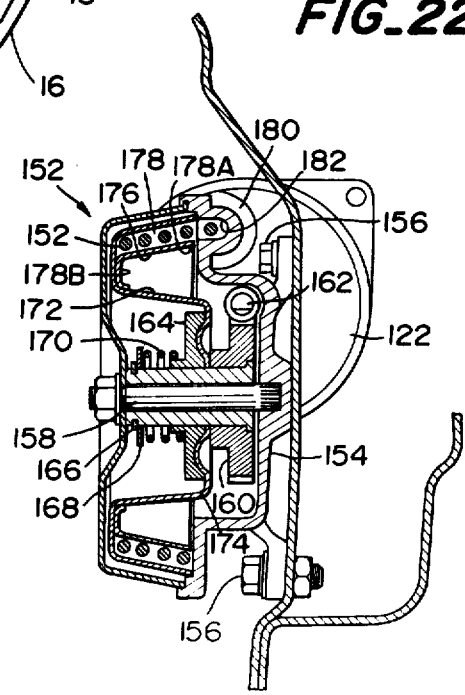
FIG_22

PASSIVE SEATBELT SYSTEM

This is a continuation of application Ser. No. 017,929, filed Mar. 6, 1979, now abandoned.

BACKGROUND OF THE INVENTION

1. Field of the Invention

This invention relates to seatbelt systems and more particularly to passive seatbelt systems which automatically fasten and unfasten the seatbelt on the passenger.

2. Prior Art

It is recognized that passenger restraining belts restrain and protect the passengers during vehicular emergencies and therefore, contribute to the safety of the vehicle. In spite of this fact, however, the percentage of passengers who wear passenger restraining belts is very low because of the difficulties is fastening the belt, a feeling of pressure when belt is worn, etc.

As a result, various types of passive seatbelt systems have been proposed which make it possible to automatically fasten the belt around the passenger after the passenger is seated himself in the vehicle. Among these systems, the type of passive seatbelt system which includes a guide rail installed on the roof side member of the vehicle so that it is oriented in the direction of the length of the vehicle and an outer end of a passenger restraining seatbelt is fastened to a truck whose movement is guided by the guide rail has been highly rated in terms of reliability. The truck is coupled with a driving means such as a motor so that the truck can be caused to move back and forth in the direction of the length of the vehicle. In this manner, the belt can be caused to approach or move away from the passenger seat. Accordingly, the belt can be automatically fastened around or moved from the passenger seated in the passenger seat.

In such passive seatbelt systems, however, it is necessary to install the truck, guide rail and driving means on the roof side member of the vehicle. As a result, these parts project into the passenger compartment of the vehicle and thereby reducing the amount of space in the passenger compartment. In addition, there is a danger that the passenger will collide with one of these parts during a vehicular emergency such as a collision. Furthermore, there is a danger that a passenger's hair will become tangled with one of these parts when the truck is in operation.

SUMMARY OF THE INVENTION

This invention has been developed to obviate the above-described disadvantages and has as its object the provision of a passive seatbelt system wherein a webbing anchor portion does not interfere with the head of an occupant and there is no possibility of catching the hair of the occupant when the webbing is automatically fastened to or unfastened from the occupant, the occupant head protecting performance is excellent in collision of the vehicle in the cross-wise direction, and the comfortable space for the occupant in the compartment of the vehicle is not reduced.

According to the present invention, a truck, to which the webbing anchor portion is secured, is made movable along a guide rail, this guide rail and a driving system for imparting a driving force to this guide rail are interposed between a roof side member and a roof lining and shielded by the roof lining, a narrow slit is formed between the roof side member and the lower end of the roof lining, and the webbing anchor portion is extended through the slit and projected toward the floor of the vehicle, whereby the protrusion of the webbing anchor portion toward the head of the occupant is eliminated, the webbing anchor portion is passed by a course apart from the occupant near a window pane or a side wall of the vehilce to prevent the webbing anchor portion from interfering with the head of the occupant and eliminate the possibility of catching the hair, so that the head of the occupant can be protected in a collision of the vehicle in the cross-wise direction. Further, in an embodiment of the present invention, such a consideration has been given to the construction that a member for imparting a tensile force, and moreover, a compressive force is used as a driving system to render a compact construction and the interval between the roof lining and the roof side member to secure a large space in the compartment, so that the head of the occupant can avoid being interfered by the roof lining.

BRIEF DESCRIPTION OF THE DRAWINGS

The above mentioned features and objects of the present invention will become more apparent with reference to the following description taken in conjunction with the accompanying drawings wherein like reference numerals denote like elements and in which:

FIG. 1 is a side view illustrating a first embodiment of a passive seatbelt system in accordance with the teachings of the present invention;

FIG. 2 is a front view of the embodiment of FIG. 1 being replaced with an anchor plate;

FIG. 3 is a partial expanded view of FIG. 1;

FIG. 4 is a cross sectional view along the line IV—IV in FIG. 3;

FIG. 5 is a partial oblique view illustrating the thick tape;

FIG. 6 is a partial view of FIG. 1 illustrating the forward stoppers;

FIG. 7 is a cross sectional view along the line VII—VII in FIG. 6;

FIG. 8 is a cross sectional view along the line VIII—VIII of FIG. 3;

FIG. 9 is a cross sectional view along the line IX—IX of FIG. 1;

FIG. 10 is a cross sectional view along the line X—X in FIG. 1;

FIG. 11 is a partial oblique view seen from the interior of the passenger compartment of the vehicle which illustrates the installation of the present invention in the area extending from the front pillar to the rocker panel;

FIG. 12 is cross sectional view along the line XII—XII in FIG. 11;

FIG. 13 is a front view illustrating a sprocket housing;

FIG. 14 is an exploded oblique view of FIG. 13;

FIG. 15 is an assembled oblique view of FIG. 14;

FIG. 16 is a view of sprocket housing from the back of the housing;

FIG. 17 is a cross sectional view along the line XVII—XVII of FIG. 1;

FIG. 18 is a side view corresponding to FIG. 3 which illustrates a second embodiment of the present invention;

FIG. 19 is a side view corresponding to FIG. 1 which illustrates a third embodiment of the present invention;

FIG. 20 is a partial expanded view of FIG. 19;

FIG. 21 is a cross sectional view along the line XXI—XXI in FIG. 19; and

FIG. 22 is a cross sectional view along the line XXII—XXII in FIG. 19.

DETAILED DESCRIPTION OF THE INVENTION

Referring more particularly to Figures, shown in FIGS. 1 and 2 is the first embodiment of a passive seatbelt system in accordance with the teachings of the present invention. In this embodiment, the passive seatbelt system includes a passenger restraining belt 10 anchored at its inner end 12 to the vehicle floor 15 via a retractor mechanism 14 which power-retracts the belt 10. This retractor mechanism 14 is installed at the approximate center of the vehicle with respect to the transverse axis of the vehicle. It would also be possible to anchor the inner end 12 of the belt 10 directly to the floor 15 omitting the retractor mechanism 14.

The outer end 16 of the belt 10 is fastened to a truck 18 which is mounted so it can move in the direction of the length of the vehicle along a roof side member 20 and this movement of the truck 18 causes the belt 10 to approach or move away from the passenger seat 22 so that the belt 10 can be automatically fastened around or removed from a passenger seated in the seat 22.

As is shown in FIGS. 3 and 4, truck 18 is provided with the movable plate 24. A slot 28 is formed in an extended portion 26 of the movable plate 24, which forms an anchor part, and projects toward the floor of floor 15 of the vehicle. The outer end 16 of the belt 10 is anchored to slot 28. Furthermore, four shafts are provided on the movable plate 24 and drum-shaped wheels whose diameter is reduced toward the middle as shown in FIG. 4 are mounted on each of the shafts 30. As is shown in FIG. 4, the wheels 32 are held in a guide rail 34 which is roughly U-shaped in cross section so that the wheels 32 can roll along the length of the guide rail 34, i.e. in the direction of the length of the vehicle.

The central portion of the guide rail 34 with respect to its U-shaped cross section is fastened to the vehicle-interior side of the roof side member 20 by means of a multiple number of fastening screws 36 so that the opening in the guide rail 34 faces toward the vehicle interior.

Furthermore, a flange 38 is provided on the top of the guide rail 34 and is fastened by means of fastening screws 44 to a flange 42 which extends from the top of a guide rail 40. Accordingly, the guide rail 40 is positioned parallel to the guide rail 34. A continuous rectangular groove 46 is formed in the central portion of the slide rail 40 so that it extends along the length of the slide rail 40. Two slide grooves 48 which substantially increase the width of the rectangular groove 46, are formed at an intermediate depth in the rectangular groove 46. A thick tape 50 shown in FIG. 5 is provided within the slide grooves 48 so that thick tape 50 can slide along the length of the slide rail 40.

As is shown in FIG. 5, the cross-sectional shape of the thick tape 50 is rectangular. A plurality of openings 51 are formed at equal intervals along the length of the tape 50. Furthermore, the dimensions of the rectangular cross section of the thick tape 50 are such that only a slight space is left between the thick tape 50 and the walls and bottoms of the slide grooves 48 in the slide rail 40 when the tape 50 is inserted in the slide grooves 48. Accordingly, the thick tape 50 is able to transmit not only a tensile force but also a compressive force. Furthermore, it is desirable that a synthetic resin be used for the material of the thick tape 50. An appropriate degree of flexibility makes it possible to bend the tape 50 at a small radius of curvature.

A sliding block 54 is fastened to one end of the thick tape 50 by means of four rivets 52. A recess 59, which accommodates a projection 58 that projects from the movable plate 24 toward the sliding block 54, is formed in a projection 56 which projects the sliding block 54 toward the movable plate 24. Inserting the projection 58 into the recess 59 makes it possible to cause the truck 18 to move simultaneously in the direction of the length of the vehicle whenever the sliding block 54 moves together with the sliding tape 50 in the direction of the length of the vehicle.

A slot is formed in the rear end of the movable plate 24. One end of a narrow belt 62 is anchored to the slot 60. The other end of the narrow belt 62 is retracted on a retractor shaft 68 of the retractor mechanism 66 which is fastened by means of the fastening bolt 64 to the roof side member 20 to the rear of the guide rail 34.

The retractor mechanism 66 is a retractor mechanism of the same design as the retractor mechanism 14 which retracts the inner end 12 of the belt 10. That is, it is the universally known emergency locking retractor which abruptly stops the extension of a belt 62 only during a vehicular emergency. Under ordinary conditions, the belt 62 is retracted by the force of a spring 70. Accordingly, the movable plate 24 which is connected to the retractor mechanism 66 by the belt 62 is caused to move toward the rear of the vehicle by the force of the spring 70. During a vehicular emergency, the extension of the belt 62 is halted by the retractor mechanism 66 so that the outer end 16 of the passenger restraining belt 10 is securely anchored to the roof side member 20.

As is shown in FIG. 4, a flange 72 is formed on the slide rail 40 in the opposite direction from the flange 42, i.e. toward the floor 15 of the vehicle. The roof lining or head liner 74 which lines the roof of the vehicle interior is fastened to the flange 72 by means of fastening screws 75. Accordingly, the guide rail 34, slide rail 40 and truck 18, etc. are clamped between the roof lining or head liner 74 and the roof side member 20.

A guide rail 34, slide rail 40 and a truck 18 are not exposed in the compartment. Particularly, a tape 50 functioning as a driving member for the turck 18 can impart a tensile force, and moreover, a compressive force, whereby it suffices for the slide rail 40 to have a small diameter only enough to form grooves 46, 48 for receiving a tape 50, so that the interval between a roof side member 20 and a roof lining 74 can be made considerably small. As against this, in a conventional seatbelt system, in which a webbing is driven by wires for imparting only the tensile force, it is necessary to use two wires for driving a truck back and forth in the vehicle between a roof side member and a roof lining, and further, there is need of housing pulleys for guiding the ends of these wires, guide pulleys for bending the moving paths of the wires and tension adjusting means for holding the tensions of the wires within a predetermined range, whereby the roof lining is bulged out into the compartment to a great extent, so that the comfortable space for the occupant in the compartment has been reduced.

In addition, as shown in FIG. 4, the outboard sides of the slide rail 40 and guide rail 34 are reliably supported on the roof side member 20 and the inboard sides thereof are reliably supported on the roof lining 74, respectively, whereby so-called center beams are formed, so that a load imparted from the webbing 10 can be reliably supported, thus improving the safety of the occupant.

Furthermore, as is shown in FIGS. 6 and 7, an L-shaped forward stopper 76 is fastened to the forward end of the guide rail 34 by means of a fastening screws 77 so that a portion of the stopper 76 projects into the interior of the guide rail 34. Accordingly, the L-shaped forward stopper 76 is able to regulate the maximum amount of movement of the movable plate 24 toward the front of the vehicle, as indicated by the two-dot chain line in FIG. 6.

In addition, as is shown in FIGS. 3 and 8, an L-shaped rear stopper 78 is fastened by means of a fastening screw 77 to the slide rail 40 near the rear end of the guide rail 34. A portion of the stopper 78 projects into the interior of the rectangular groove 46 in the slide rail 40. Accordingly, as is shown in FIG. 3, the L-shaped rear stopper 78 regulates the amount of movement toward the rear of the vehicle of the thick tape 50 through the slide grooves 48.

As is shown in FIGS. 9 and 10, the slide rail 40 is fastened to the vehicle-interior side of the front pillar 79 of the vehicle by means of fastening screws 44 so that the slide rail 40 drops along the front pillar 79. As is shown in FIG. 11, the lower end of the slide rail 40 is fastened to a sprocket housing 82. As is shown in FIGS. 12 and 16, the sprocket housing 82 takes the form of a thick circular plate. A roughly circular recess 86 for the sprocket wheel 84 is formed in the body of the sprocket housing 82. When a cover 88 is fastened to the sprocket housing 82, the housing recess 86 is closed off.

An arc-shaped channel 90 is formed near the circumference of the housing recess 86 in the sprocket housing 82 and the cover 88. This arc-shaped channel 90 consisting of two matching grooves which are positioned so that they form a channel is smaller in diameter than the housing recess 86. However, the arc-shaped channel 90 cuts deeper into the sprocket housing 82 and cover 88 than housing recess 86. The arc-shaped channel 90 accommodates a portion of the thick tape 50 that is engaged with the sprocket wheel 84. In this case, the arc-shaped channel is annular, however, the arc-shaped channel in this invention does not necessarily have to be a continuous annular channel. Furthermore, a pair of tape passage channels 92 and 94 which extend more or less tangentially from the arc-shaped channel 90 are cut to the same depth in the sprocket housing 82 and cover 88 as is the arc-shaped channel 90. These channels 92 and 94 are oriented in opposite directions and allow the entrance and exit of a portion of the thick tape 50 that engages with the sprocket wheel 84. Accordingly, the thick tape 50 enters the arc-shaped channel 90 via the tape passage channel 92 and engages with the sprocket wheel 84 and then exits the sprocket housing 82 via the tape passage channel 94.

In this invention, spare passage channels 96, 98, 100 and 102 which are tangential to the arc-shaped channel 90 in the housing recess 86 are formed in the sprocket housing 82 and cover 88. Accordingly, the angle of intersection (angle $\theta$ in FIG. 16) of the portion of the thick tape 50 bent in the sprocket housing 82 can be altered. Furthermore, Three fastening flanges 104 project from equidistant points on the circumference of the sprocket housing 82. As is shown in FIG. 12, fastening screws 106 are used to fasten the sprocket housing 82 to the front pillar 79 of the vehicle via a bracket 107. Accordingly, the sprocket housing 82 can be installed on the front pillar 79 with the thick tape 50 already wrapped around the sprocket wheel 84. As a result, the efficiency of installation work can be improved. Furthermore, as to the positioning of the thick tape 50 relative to the sprocket wheel 84 during installation, it is necessary merely to wrap the tape 50 around the sprocket wheel 84 with the movable plate 24 in contact with the L-shaped forward stopper 76, as is shown in FIG. 6. Accordingly, positioning is very simple.

In addition, six support projections 108 which are similar in shape to the flanges 104 but which are thicker, are attached to the circumference of the sprocket housing 82. A fastening part 110 which extend from one end of the slide rail 40 is fastened by means of the screw to one of the support projections 108. Accordingly, when the entrance and exit portions of the thick tape 50 with respect to the sprocket housing 82 are altered, the appropriate support projection 108 corresponding to the appropriate spare passage channels 96 through 106 is selected for attachment of the slide rail 40.

The driving shaft 114 of a reversible motor 112 is inserted into the interior of the sprocket housing 82 via a hole 111 in the cover 88 and is fastened to the sprocket wheel 84. The motor 112 is inserted into the interior of the front pillar 79 via cut-out 116 formed in the front pillar 79. The motor 112 is fastened to the inside of the front pillar 79 by means of a bracket 118 and fastening screws 120. Furthermore, motor 112 is caused to operate by being electrically connected with a source of electrical power of the vehicle. This connection is initiated by the opening and closing of the door and by actuation of a seat switch (not shown in the figures) which is embedded in the passenger seat so that it detects the seated passenger. Furthermore, the number of rotation of the motor 112 is controlled by some well-known device or circuitry.

In the present invention, the direction of the rotation of the motor 112 is arranged such that when the passenger opens the door in order to enter or leave the vehicle, the motor turns so that the sprocket wheel 84 is caused to rotate in a counterclockwise direction; and such that when the door is closed, the motor 112 turns so that the sprocket wheel 84 is caused to rotate in a clockwise direction. Furthermore, the number of rotation completed by the sprocket wheel 84 is set so that the truck 18 stops before it contacts the L-shaped forward stopper 76 at the forward end of the guide rail 34 when the truck 18 is moving toward the front of the vehicle and so that the truck 18 stops before the thick tape 50 contacts the L-shaped rear stopper 78 as shown in FIG. 3 when the truck 18 is moving toward the rear of the vehicle.

A second slide rail 122 is fastened to the sprocket housing 82 in somewhat the same manner as the slide rail 40 by means of a fastening screw. As is shown in FIG. 11, the second slide rail 122 extends from the lower end of the front pillar 79 into the interior of the rocker panel 124 of the vehicle via an opening 125. When the sprocket wheel 84 is caused to rotate in a counterclockwise direction, the thick tape 50 pushed out of the second slide rail 122 is pushed into the interior of the rocker panel 124.

It should be apparent that the thick tape 50 should be at least long enough to reach from the sprocket housing 82 to the movable truck 18 so that the driving force of the sprocket wheel 84 is always transmitted to the truck 18 even when the truck 18 approaches the rear stopper 78.

To complete the installation of the passive seatbelt system, a front pillar garnish 15A as shown in FIG. 9 is installed, a cowl side trim 15B as shown in FIG. 10 is installed and carpet and scuff plates 15C and 15D as shown in FIG. 17 respectively are provided.

For the purposes of the following description of the operation of the present invention, it is assumed that the vehicle is in motion and the passenger is wearing the belt 10 is illustrated in FIG. 1. Furthermore, the truck 18 has completed its maximum amount of movement toward the rear of the vehicle on the guide rail 34 so that the belt 10 is fastened around the passenger. With the belt 10 thus fastened, the belt 10 can be extended from the retractor mechanism 14 so that the passenger can alter his driving position.

In operation, if the vehicle is involved in an emergency such as collision, the emergency locking mechanism inside the retractors 14 and 66 abruptly stop the extension of the belt 10 and the narrow belt 62. As a result, the outer end 16 of the belt 10 is securely anchored to the roof side member 20 by the truck 18 and the passenger is restrained so that his his safety is insured.

Alternately, when the passenger opens the door in order to leave the vehicle, the motor 112 causes the sprocket wheel 84 to rotate in a counterclockwise direction with respect to FIG. 1. As a result, tension is applied to the thick tape 50 so that the tape 50 moves through the slide rail 40 in the direction indicated by the arrow A. As a result, the truck 18, which is engaged with the tape 50 via the sliding block 54, is caused to move toward the front of the vehicle along the guide rail 34. Accordingly, the outer end 16 of the belt 10 is caused to move the considerable distance toward the front of the vehicle as indicated by the two-dot chain line in FIG. 1. As a result, a sufficient space for the passenger to leave the vehicle is formed between the belt 10 and the passenger seat 22 and the passenger can easily exit from the vehicle.

When the passenger closes the door after re-entering the vehicle and seating himself in the passenger seat, the motor 112 is reversed so that compressive force is applied to the thick tape 50 to thereby cause the tape 50 to move in a direction opposite the direction indicated by the arrow A. Accordingly, the sliding block 54 moves toward the retractor mechanism 66. As a result, the truck 18 moves toward the retractor mechanism 66 with the force of the spring 70 also being applied to the truck 18 and the belt 10 is automatically fastened around the passenger (as shown in FIG. 1).

Since the motor 112 is installed in the portion of the front pillar 79, the noise generated by the motor when the belt 10 is driven is muffled so that it does not cause annoyance to the passenger to any appreciable extent.

Furthermore, in this embodiment, the lower end portion 74A of the roof lining 74 and the lower end portion 20A of the roof side member 20 form in cooperation a narrow slit, in which only an extension 26 of a movable plate 24 can move back and forth in the vehicle, and hence, only this slit and the movable plate 24 projected therefrom may be seen from the occupant and the truck 18 moving back and forth in the vehicle and the tape 50 do not pass by about the head of the occupant and are not seen, so that occupant does not feel any fear. Further, this slit continues to extend along the side portion of the vehicle as viewed in the crosswise direction of the vehicle, i.e., the window pane in the longitudinal direction of the vehicle, and the extended portion 26 of the movable plate 24 moves in the longitudinal direction of the vehicle along the window pane, i.e., moves along a course farthest from the occupant. In addition, the slit faces not toward the face of the occupant but toward the floor, whereby the truck 18 does not interfere with the head of the occupant, and there is no danger of that the hair, cap or the like of the occupant are drawn into the slit.

Referring to FIG. 18, shown therein is a second embodiment of a passive seatbelt system in accordance with the teachings of the present invention. In this embodiment, a different embodiment of the means used to engage the movable plate 24 with the thick tape 50 is shown. In this embodiment, a projection 56 on the sliding block 54 is caused to contact from the rear with respect to the vehicle, a projection 58A which projects from the movable plate 24 toward the thick tape 50. This embodiment is designed such that the projections 56 and 58A can separate from each other. Accordingly, on the sliding block 54 is caused to move toward the front of the vehicle by the thick tape 50, the movable plate 24 is caused to move toward the front of the vehicle by means of the projection 58A. However, the movable plate 24 can also be moved toward the front of the vehicle independently of the sliding block 54. Thus, in this embodiment, the movable plate 24 can move toward the front of the vehicle when the passenger alters his driving posture while wearing the belt 10. Therefore, the freedom of movement of the passenger is increased. Furthermore, if the passenger should grasp the belt 10 or deliberately move his body while the outer end 16 of the belt 10 is being moved by the thick tape 50, the truck 18 can separate from the sliding block 54. Accordingly, various parts of the mechanism are protected from damage. The remaining portions of the second embodiment are the same as those of the first embodiment and are given like reference numerals and a description of their interconnection in operation is omitted.

Referring to FIGS. 19 through 22, shown therein is a third embodiment for a passive seatbelt system in accordance with the teachings of the present invention. This embodiment differs from the first and second embodiments in that a wire 150 is used as a transmission part in order to transmit the driving force of the motor 122 to the truck 18. The wire 150 is designed so that it is able to transmit a tensile force which is applied in the direction of the length of the wire 150. As is shown in FIGS. 20 and 21, one end of the wire 150 is fastened to a sliding block 54A by means of a clasp. An intermediate portion of the wire 150 is inserted in a slide groove 48A which is roughly circular in cross section drilled in the slide rail 40 so that the wire 150 can slide through the slide groove 48A.

The other end of the wire 150 is retracted by a wire-retracting mechanism 152 which is fastened to the roof side member 20 in front of the guide rail 34. As is shown in detail in FIG. 22, the wire-retracting mechanism 152 is designed such that a saucer-shaped base 154 of the wire-retracting mechanism 152 is fastened to the roof side member 20 by means of fastening bolts 156. A shaft 158 is fastened to the center of the base 154. A worm wheel 160 is mounted so that it can rotate on the shaft 158 and is engaged by a worm 162 which is mounted on the base 154. The worm 162 is driven by the motor 112 which is fastened to the roof side member 20 by means of a bracket.

Furthermore, a pressure-receiving disc 164 is mounted on the shaft 158. A compression coil spring 170 is interposed between the pressure-receiving disc 164 and ring 168 which is fastened to the shaft 158 by means of a C-ring 166. Accordingly, the pressure-receiving disc 164 is pushed against the worm wheel 160 by the force of the spring 170 so that friction causes the pressure-receiving disc 164 to rotate together with the worm wheel 160.

A thin rotating plate 174 which has an annular channel 172 which is U-shaped in cross section is attached to the pressure-receiving disc 164. One side of a tapered winding drum 176 is fastened to the bottom of the annular channel 172 so that an annular wire housing space 178 which is tapered in cross section is formed between the winding drum 176 and the rim of the rotating plate 174.

A U-shaped wire-guiding wall 180 is formed in the base 154. The interior side of the wire-guiding wall 180 acts as a wire-guiding groove 182. This wire-guiding groove 182 is oriented so that it is tangential to the maximum diameter portion 178A of the annular wire housing space 178. As a result, the wire housing space 178 is connected with the slide groove 48A of the slide rail 40. Furthermore, the end of the wire 150 is followed to the minimum diameter portion 178B of the winding drum 176. Accordingly, the rotation of the motor 112 in one direction causes the winding drum 176 to wind the wire 150 around the wire drum 176 in successive coils from the minimum diameter portion of the drum 176 toward the maximum diameter portion of the drum 176 so that the sliding block 54 is caused to move toward the front of the vehicle. When motor 112 is reversed so that it is caused to rotate in the opposite direction, the wire 150 is unwound in successive turns from the maximum diameter portion of the winding drum 176 toward the minimum diameter portion of the drum 176. As a result, compressive force applied to the wire 150 causes the sliding block 54A to move toward the rear of the vehicle.

The remaining construction of the present embodiment is identical to that of the second embodiment and like elements are given like reference numerals and a description of their interconnection in operation is omitted.

Even in this embodiment with the above-described arrangement, the slide rail 40, truck 18, guide rail 34 are interposed between the roof side member 20 and the roof lining 74, and the wire 150 can impart both tensile an compressive forces, so that the slide rail 40 can be rendered simple in construction and compact in size. Consequently, it suffices for the interval between the roof side member 20 and the roof lining 74 to be small in value, whereby the roof lining 74 does not bulge out into the compartment.

Furthermore, as for the slit formed between the roof side member 20 and lower end of the roof lining 74 has the same construction as that in the preceding embodiment, so that the same advantage can be achieved.

I claim:

1. A passive seatbelt system for a vehicle comprising:
a guide rail fastened to a vehicle-interior side of a roof side member of the vehicle;
a truck guided by said guide rail and which moves along said guide rail, said truck comprising a seatbelt anchor portion which extends downwardly and to which said seatbelt is fastened;
a driving system which drives said truck, said driving system comprising a driving force transmitting member for driving said truck;
a slide rail fastened to said guide rail, said slide rail comprising a groove provided on one side surface thereof opposed to said truck for restrainingly surrounding said driving force transmitting member; and
a roof lining extending over said guide rail, truck, driving system and slide rail, said roof lining being coupled to said slide rail and to a roof side of said vehicle such that a slit is formed between the roof lining and said roof side member adjacent to said guide rail through which said seatbelt anchor portion of said truck extends whereby the guide rail, truck, driving system and slide rail are provided between the roof lining and the roof side member and the guide rail, driving system and slide rail do not project into the interior of the vehicle.

2. A passive seatbelt system for a vehicle as set forth in claim 1, wherein said guide rail is of substantially a letter U shape opening into the vehicle-interior side of the vehicle.

3. A passive seatbelt system for a vehicle as set forth in claim 1, wherein said seatbelt anchor portion comprises a platelike member.

4. A passive seatbelt system for a vehicle as set forth in claim 3, wherein said platelike member is connected at the upper end thereof to the driving force transmitting member of the driving system.

5. A passive seatbelt system for a vehicle comprising:
a guide rail fastened to a vehicle-interior side of a roof side member of the vehicle;
a truck guided by said guide rail and which moves along said guide rail, said truck comprising a seatbelt anchor portion which extends downwardly and to which said seatbelt is fastened;
a driving system which drives said truck, said driving system comprising a driving force transmitting member for driving said truck;
a slide rail fastened to said guide rail, said slide rail comprising a groove provided on one side surface thereof opposed to said truck for restrainingly surrounding said driving force transmitting member;
a wheel guided by said guide rail and fastened to said truck for guiding said truck; and
a roof lining extending over said guide rail, truck, driving system and slide rail, said roof lining being coupled to said slide rail and to a roof side of said vehicle such that a slit is formed between the roof lining and said roof side member adjacent to said guide rail through which said seatbelt anchor portion of said truck extends whereby the guide rail, truck, driving system and slide rail are provided between the roof lining and the roof side member and the guide rail, driving system and slide rail do not project into the interior of the vehicle and the truck is driven by the driving force transmitting member at the upper end thereof with the guide through the wheel.

* * * * *